United States Patent [19]

Martin

[11] 4,432,394
[45] Feb. 21, 1984

[54] GROOVED COUPLING PROTECTOR

[76] Inventor: Dennis E. Martin, 170 Moonraker Dr., Slidell, La. 70458

[21] Appl. No.: 390,660

[22] Filed: Jun. 21, 1982

[51] Int. Cl.³ .................. B65D 59/00; F16L 57/00
[52] U.S. Cl. .............................. 138/96 T; 138/89; 285/332.3; 285/333
[58] Field of Search .......... 138/89, 96 R, 96 T; 285/332.4, 333, 334, 332.3

[56] References Cited

U.S. PATENT DOCUMENTS

| | | | |
|---|---|---|---|
| 497,990 | 5/1893 | Simrell | 285/333 |
| 1,640,969 | 9/1927 | Westerman . | |
| 1,675,143 | 10/1928 | Shrum . | |
| 2,587,544 | 2/1952 | Sneddon . | |
| 2,893,437 | 7/1959 | Pickard | 138/96 T |
| 2,980,451 | 4/1961 | Taylor et al. | 285/332.3 |
| 3,285,289 | 11/1966 | Titus . | |
| 4,119,121 | 10/1978 | Smiley . | |

*Primary Examiner*—James E. Bryant, III
*Attorney, Agent, or Firm*—Cushman, Darby & Cushman

[57] ABSTRACT

A System for protecting the threaded cavities and the seal ring in a grooved A.P.I. coupling comprises first and second threaded portions separated by a substantially smooth portion, the second threaded portion being dimensioned so that it will freely pass through the space defined the seal ring when inserted into the threaded cavity during installation yet, due to the taper of the A.P.I. coupling, will engage a predetermined portion of threads therein below the seal ring to effect secure threaded engagement, the smooth portion being closely fitted against the seal ring to protect same.

11 Claims, 3 Drawing Figures

GROOVED COUPLING PROTECTOR

BACKGROUND AND SUMMARY OF THE PRESENT INVENTION

The present invention generally relates to a device for protecting threaded couplings manufactured in accordance with the specifications of the American Petroleum Institute (hereinafter referred to as A.P.I.). In particular, the present invention is related to a device for protecting not only the threaded cavities of such A.P.I. couplings but also a seal ring seated therein. Thus, the device according to the present invention provides protection to threaded seal-ring forms of A.P.I. couplings from environmental damage and, additionally, provides a measure of protection from mechanical damage for all tubing and casing couplings manufactured in accordance with A.P.I. specifications.

In practice, couplings having A.P.I. threads are utilized to join tubing or casing joints (e.g., lengths of conduit or pipe) together for the purpose of completing oil and/or natural gas production wells, injection wells, storage wells, flow lines, and other instances where piping connections are necessary. Most, if not all, couplings presently manufactured by domestic and foreign steel mills or other manufacturers are of the type having only an inwardly tapered threaded cavity. Such couplings having only an inwardly tapered threaded cavity in accordance with A.P.I. specifications will be hereinafter referred to as "standard A.P.I. couplings" (see FIG. 1).

In situations where high pressures and extreme temperatures are encountered during the well-drilling process, a connection is needed which provides a constant leak-proof barrier when the tubing joints or successive lengths of casing joints are coupled together. Accordingly, in order to overcome the problems of high pressure wells in such situations, an A.P.I. coupling having machined retaining grooves with Teflon-type seal rings inserted therein was developed, as exemplified by U.S. Pat. No. 2,980,451 to Taylor et al, the entire disclosure of which is incorporated herein by reference. Such couplings having trapped seal rings shall be hereinafter referred to as "grooved couplings" (see FIG. 2). Grooved couplings increase the leak resistance of standard A.P.I. threaded couplings by providing an occlusive barrier against the seepage of gases and liquids when successive lengths of pipes or casing joints are coupled together, especially where high pressures are encountered.

As mentioned above, in practice the standard A.P.I. coupling is practically the only type that is manufactured at steel mills and other manufacturing facilities. The decision to modify the standard A.P.I. coupling into a grooved coupling is entirely left up to the discretion of the end user (e.g., petroleum companies, well drilling companies, or the like). If, in the discretion of such companies, it is decided that grooved couplings are necessary for the particular environment in which they are to be utilized, there are in existence several companies which can produce a grooved coupling by having the seal rings inserted into grooves machined into the standard A.P.I. coupling.

In order to transport the grooved couplings from the modifications facility to the location where they will usually be placed into service, protectors to protect the threaded cavity and the seal rings are usually desirable. However, traditionally the type of protector which is utilized for the grooved couplings is the same as the protector utilized for standard A.P.I. couplings to protect the threaded cavity thereof during transportation and handling.

When utilized in conjunction with grooved couplings, the conventional protectors that are manufactured for the standard A.P.I. couplings have been found to be insufficient for their intended purpose. Since the grooved coupling includes seal rings seated therein, the protector for the standard A.P.I. coupling cannot be threadably engaged beyond the location of the seal ring. Thus, the protector only engages a portion of the threads above the seal ring in the grooved couplings. The conventional protector, therefore, is extremely susceptible to loose fitting engagement and, in most cases, will be disengaged from the coupling during transportation thereby obviating its intended protective function. Thus, the need in the art for protectors capable of complete protection for grooved couplings has been apparent, yet until the present invention, this need had remained unanswered.

Of course, others in this art have developed various means for protecting pipe threads or the like as exemplified by U.S. Pat. Nos. 1,640,696; 1,675,143; 2,893,437; 3,285,289 and 4,119,121. For example, U.S. Pat. No. 2,893,437 discloses a protector nipple having upper and lower threaded portions and a relatively smooth shoulder portion so as to facilitate quick, threaded connection of the nipple within the end of a threaded pipe or coupling. Another type of "quick" threaded connecting structure can be seen in U.S. Pat. No. 2,587,544. U.S. Pat. Nos. 1,675,143 and 1,640,969 relate specifically to various contrivances for protecting the threads of pipe and/or well drilling tools from damage, while U.S. Pat. No. 4,119,121 relates to a plastic closure securely insertable into the end of a pipe to protect the threads thereof from damage. Further, U.S. Pat. No. 3,285,289 proposes an adjustable clean-out for a sanitary plumbing system and includes a relatively smooth, cylindrical outer surface for slidably engaging with an O-ring therein.

However, such prior art pipe thread protectors or the like are not suitable for use with grooved A.P.I. couplings as is apparent when detailed consideration is given to the disclosures of the above-cited patents.

The present invention, however, provides a coupling adapted for threaded cooperation with grooved A.P.I. couplings and eliminates the problems associated with conventional protectors. Accordingly, a primary object of the present invention is to provide a device which is capable of threaded engagement with grooved A.P.I. couplings so as to protect not only the inwardly tapered threaded cavity of such couplings, but also the seal ring thereof from potential mechanical and environmental damage during transportation and handling until it is desired to be placed into service.

Other objects and advantages of the present invention will become more clear to those skilled in the art after careful consideration is given to the detailed description of the preferred exemplary embodiments which follow.

DETAILED DESCRIPTION OF THE PREFERRED EXEMPLARY EMBODIMENTS

Figure 1:
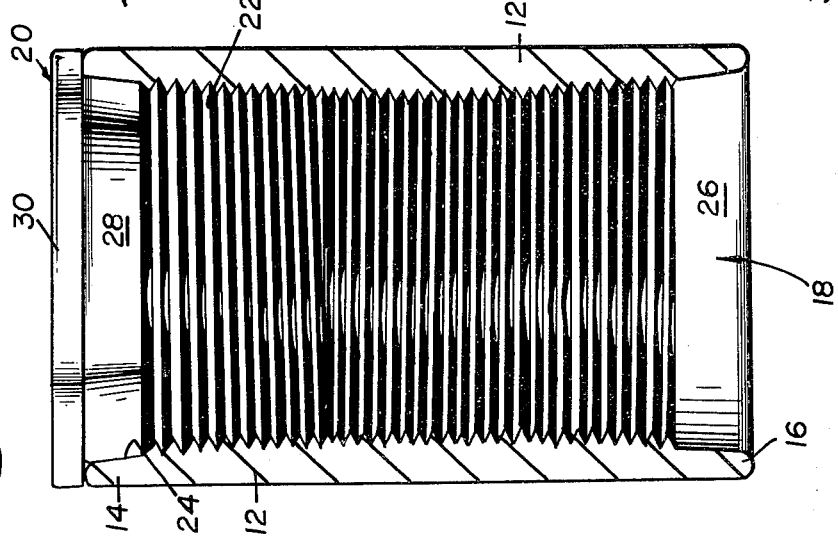
FIG. 1 depicts a cross-sectional elevational view of a standard A.P.I. coupling having a conventional threaded protector properly positioned therein.

A cross-sectional view of a standard A.P.I. coupling 10 is shown in FIG. 1. The standard coupling 10 generally includes concentrically and inwardly tapering walls 12 from each end portion 14, 16 towards the general midpoint of the coupling. A threaded cavity 18 is defined by the walls 12 of the standard A.P.I. coupling 10 so as to be capable of threadingly engaging with casing joints and coupling lengths of such casing joints together. Walls 12 of the standard A.P.I. coupling 10, as mentioned above, taper concentrically from each end portion 14, 16 so that generally at the midpoint of coupling 10, cavity 18 is less in cross-sectional dimension when compared to the cross-sectional dimension of cavity 18 in the areas of end portions 14, 16.

A conventional protector 20 generally includes male threads 22 which are dimensioned so as to fit the taper of walls 12 in the standard A.P.I. coupling 10. Rim portions 24, 26 (if present) in the area of each end portion 14, 16 provide an area against which surface 28 of protector 20 can seat. Of course, if the threads on the pipe extend to the end thereof, then rim portions 24, 26 would also be threaded. A flange 30 is provided on protector 20 so as to protect against mechanical damage to the coupling face. It also provides a surface that is capable of being grasped firmly by hand or by a wrench. Of course, only one protector 20 is shown in FIG. 1. However, in practice each end portion of cavity 18 may be provided with a protector 20 so as to completely close and thereby protect the threads of cavity 18. Thus, all discussion with respect to one protector may be similarly applicable to a second protector (not shown) if it is needed. Often the other end (i.e., cavity 18) is installed on a length of casing or tubing prior to shipment thus avoiding the need for a second protector.

Figure 2:
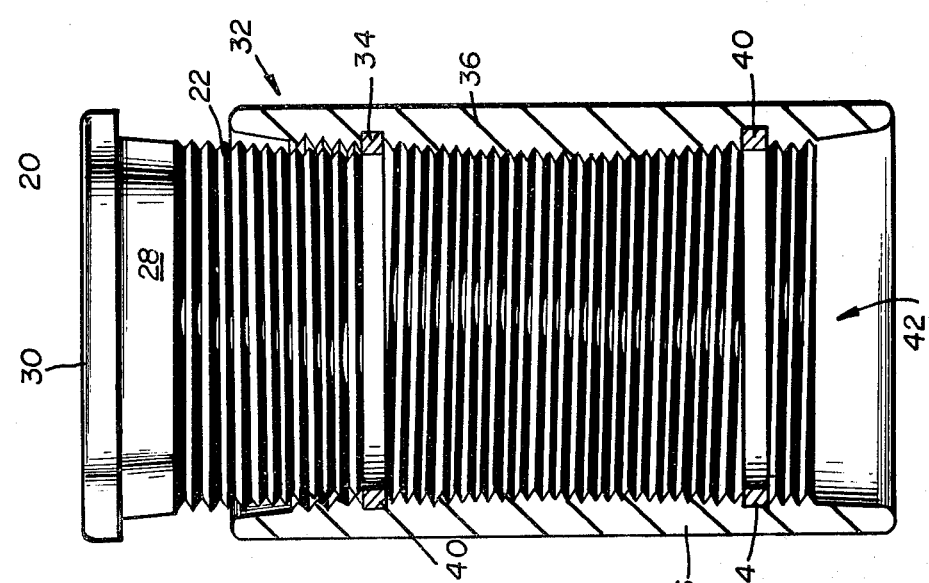
FIG. 2 depicts a cross-sectional elevational view of a grooved A.P.I. coupling showing the extent of threaded engagement when utilizing a conventional protector.

A grooved coupling 32 is depicted in FIG. 2. Basically, the grooved coupling 32 is the same as the standard A.P.I. coupling 10 depicted in FIG. 1 except that it has been modified by machining grooves 34 into the walls 36 of coupling 32 and fitting seal rings 40 therein (see, e.g., U.S. Pat. No. 2,980,451). In such a manner, the grooved coupling 32 when utilized to join casing joints or the like provides an occlusive seal which increases the leak resistance of the coupling.

As noted above, in practice, a conventional protector 20 normally utilized to protect the threaded cavity 18 of a standard A.P.I. coupling 10 (see FIG. 1) is also utilized in combination with the grooved coupling 32 depicted in FIG. 2. However, as shown therein, the conventional protector 20 can only be threaded with a small portion of the threaded cavity 42 above sealing ring 40. Also, due to the tapered nature of the male threads 22 of the conventional protector 20, those threads that do, in fact, engage with the threaded cavity 42 are fairly loose-fitting and, therefore, do not provide secure threaded engagement.

Accordingly, it has been found in practice that the conventional coupling protector 20 tends to become disengaged during transportation thereby obviating its intended function. On the other hand, if the protector is forced into threaded cavity 18 so as to be in position similar to that depicted in FIG. 1, damage to the seal ring 40 may occur and, as a consequence thereof, the coupling will not exhibit its occlusive sealing effect for which it is modified.

Figure 3:
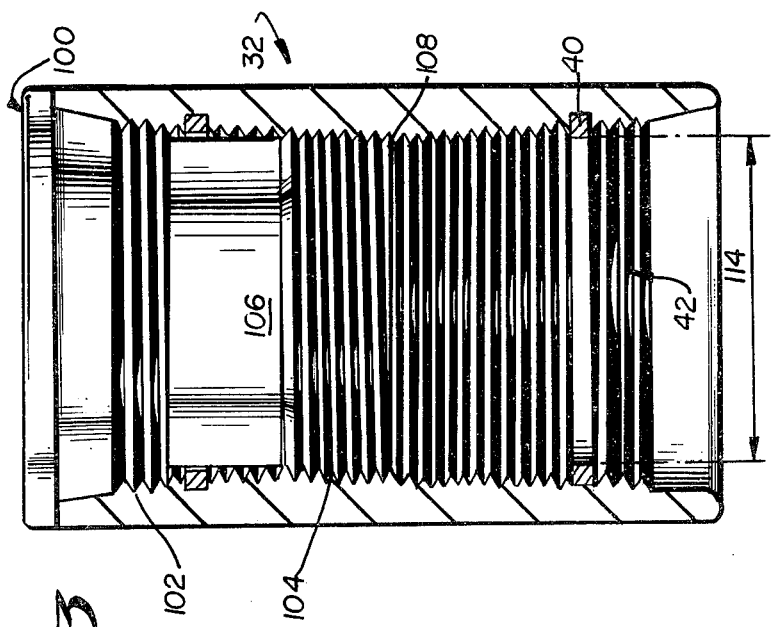
FIG. 3 depicts a cross-sectional elevational view of one embodiment of the device according to the present invention and is shown properly positioned in the threaded cavity of a grooved coupling.

However, according to the present invention, there is provided a novel device which protects not only the threaded cavity of a grooved coupling, but also the seal ring thereof. As shown in FIG. 3, a grooved coupling 32 may be provided with a protector 100 according to the present invention. The protector 100 generally comprises a first threaded portion 102 and a second threaded portion 104 separated by a substantially smooth portion 106. The axial length of protector 100 is such that when properly positioned (as shown in FIG. 3) in the grooved coupling 32, the terminal end portion 108 extends to about the midpoint of the grooved coupling 32. Once again, while only one protector 100 is shown in FIG. 3 for clarity installed in end 110, it will be appreciated that when a similar protector is installed in end 112, substantially the entire cavity 42 will be engageable with either one of the protectors. Thus, the discussion which follows relating to protector 100 installed in end 110 is similarly applicable to a like protector 100 installed in end 112.

The dimensioning of protector 100 is an important aspect of the present invention. For example, the dimension of the second threaded portion 104 is preferably such that the maximum cross-sectional dimension thereof is less than the interior cross-sectional dimension 114 of seal rings 40. Also, the dimension of the smooth portion 106 is such that it closely fits in the interior dimension 114 defined by seal ring 40. The cross-sectional dimension of the first threaded portion 102 is less in the area of the smooth portion so that it threadingly cooperates with only that portion of threaded cavity 42 above seal ring 40. Due to this dimensioning, when protector 100 is inserted into cavity 42, the second threaded portion 104 will freely pass by seal ring 40 thereby leaving it undamaged. However, due to the tapered nature of the threaded cavity 42 in a grooved A.P.I. coupling, the second threaded portion 104 will engage a portion of the threads below the seal ring 40. Thus, when this occurs, the protector 100 may be threadably engaged within cavity 42 until both the second threaded portion 104 and the first threaded portion 102 are engaged with a respective portion of threads in threaded cavity 42.

Thus, according to the present invention, the potential for disengagement of the protector 100 during transportation and/or handling is practically eliminated. Additionally, substantially the entire threaded cavity 42 is engaged with the protector 100 when two protectors are utilized, e.g., one in each end 110, 112 of coupling 32. Thus, the seal rings 40 are completely protected from damage during transportation or the like due to the close fit of smooth portion 106. When it is desired to utilize coupling 32, one need only to simply remove the protector 100 and install the coupling properly in place so as to couple adjoining casing joints or the like.

While the present invention has been described in what is presently conceived to be the most preferred embodiments thereof, it may be readily appreciated by those in the art that many modifications shall be accorded the broadest scope of the appended claims so as to encompass all equivalent structures, devices and assemblies.

What is claimed is:

1. A system for protecting threaded couplings during transportation and/or handling comprising in combination:
a coupling having opposing end portions each defining a coupling face, said coupling including interiorly tapering walls between said end portions and the midpoint of said coupling and defining a threaded cavity therebetween, said coupling including first and second axially disposed grooves carrying first and second seal rings each defining an interior space, respectively, said first groove and seal ring positioned between one end and said midpoint and said second groove and seal ring positioned between said other end and said midpoint;
at least one protecting member for threaded engagement in one of said end portions and including a threaded portion for threadably engaging with said threaded cavity above said seal ring and a substantially smooth portion dimensioned so as to closely fit in the interior space defined by the respective said seal ring, said at least one protector further including flange means for preventing damage to the coupling face of said one of said end portions and for permitting said at least one protector to be grasped.

2. A system as in claim 1 wherein said protecting member further includes a second threaded portion separated from said first mentioned threaded portion by said substantially smooth portion, said second threaded portion having a maximum cross-sectional dimension less than the diameter of said interior space so as to be freely capable of passing therethrough during installation and being dimensioned so as to be engageable with that portion of said threaded cavity below said seal ring.

3. A system as in claim 2 wherein the axial dimension of said protecting member is such that said second threaded portion terminates in the area of said midpoint.

4. A system as in claim 1 or 2 wherein two protecting members are provided, said first mentioned protecting member engageable in said one end and said second member engageable in said other end, flange means of said first mentioned protecting member and said second protecting members for enclosing and protecting said threaded cavity.

5. A system as in claim 4 wherein each of said first mentioned and said second protecting members is dimensioned in the axial direction so as to terminate in said threaded cavity in the area of said midpoint.

6. In combination with a cylindrical A.P.I. pipe coupling of the type having opposing end portions each defining a coupling face, said coupling defining between said end portions a threaded cavity concentrically and gradually tapering from each of said end portions to generally the midpoint of said coupling so that said cavity in the area of each of said end portions has a greater cross-sectional dimension that the cross-sectional dimension of said cavity in the area of said midpoint, said coupling including at least one concentrically seated seal ring in said cavity a predetermined distance between a predetermined one of said end portions and said midpoint and defining a circular interior space having a predetermined diameter; an elongated protector for protecting said threaded cavity and said seal ring prior to use including first and second threaded portions separated by a substantially smooth portion of a predetermined axial dimension, said first threaded portion being concentrically tapered in the direction of said substantially smooth portion, the cross-sectional dimension of said first threaded portion being less adjacent said smooth portion and so that said first threaded portion threadingly cooperates only with said threaded cavity in the area above said seal ring, wherein said smooth portion is dimensioned so as to effect a close fit with said seal ring when said protector is properly positioned in said threaded cavity, and wherein said second threaded portion has a maximum cross-sectional dimension less than said predetermined diameter so as to permit relatively free passage of said second threaded portion past said seal ring when said protector is being installed, said second threaded portion threadably engaging a portion of said threaded cavity below said seal ring after passing freely through said interior space, and said protector including flange means for preventing damage to the coupling face of said one of said end portions and to provide a measure of protection for said threaded cavity and said seal ring during handling and/or shipping of said coupling.

7. A combination as in claim 6 wherein said second threaded portion is dimensioned in the axial direction so as to terminate generally at said midpoint when said protector is properly installed.

8. A combination as in claim 6 wherein two protectors are provided, said first mentioned protector being engageable in one of said end portions and said second protector
being engageable in the other of said end portions
said flange means of said first mentioned and said second protectors for completely enclosing said threaded cavity.

9. A combination as in claim 8 wherein each of said first mentioned and said second protectors is dimensioned in the axial direction so as to terminate in said threaded cavity in the area of said midpoint.

10. In combination with a cylindrical A.P.I. pipe coupling of the type having opposing end portions each defining a coupling face, said coupling defining between said end portions a threaded cavity concentrically and gradually tapering from each of said end portions to generally the midpoint of said coupling so that said cavity in the area of each of said end portions has a greater cross-sectional dimension than the cross-sectional dimension of said cavity in the area of said midpoint, said coupling including upper and lower concentrically seated seal rings in said cavity a predetermined distance between a respective one of said end portions and said midpoint and each seal ring defining a circular interior space having a predetermined diameter; upper and lower elongated protectors each for protecting said threaded cavity and a respective one of said seal rings prior to use, each of said upper and lower protectors including first and second threaded portions separated by a substantially smooth portion of a predetermined axial dimension, said first threaded portion being concentrically tapered in the direction of said substantially smooth portion, the cross-sectional dimension of said first threaded portion being less adjacent said smooth portion and so that said first threaded portion threadingly cooperates only with said threaded cavity in the area above said ring, wherein said smooth portion is dimensioned so as to effect a close fit with said seal ring when said protector is properly positioned in said threaded cavity, and wherein said second threaded portion has a maximum cross-sectional dimension less than said predetermined diameter so as to permit relatively free passage of said second threaded portion past said seal ring when said protector is being installed, said second threaded portion threadably engaging a portion of said threaded cavity below said seal ring after passing freely through said interior space, and said protector including flange means adjacent said repective coupling face for preventing damage thereto and for completely enclosing said threaded cavity to provide a measure of protection for said threaded cavity and said seal ring during handling and/or shipping of said coupling.

11. A combination as in claim 10 wherein each of said upper and said lower protectors is dimensioned in the axial direction so as to terminate in said threaded cavity in the area of said midpoint.

* * * * *